UNITED STATES PATENT OFFICE.

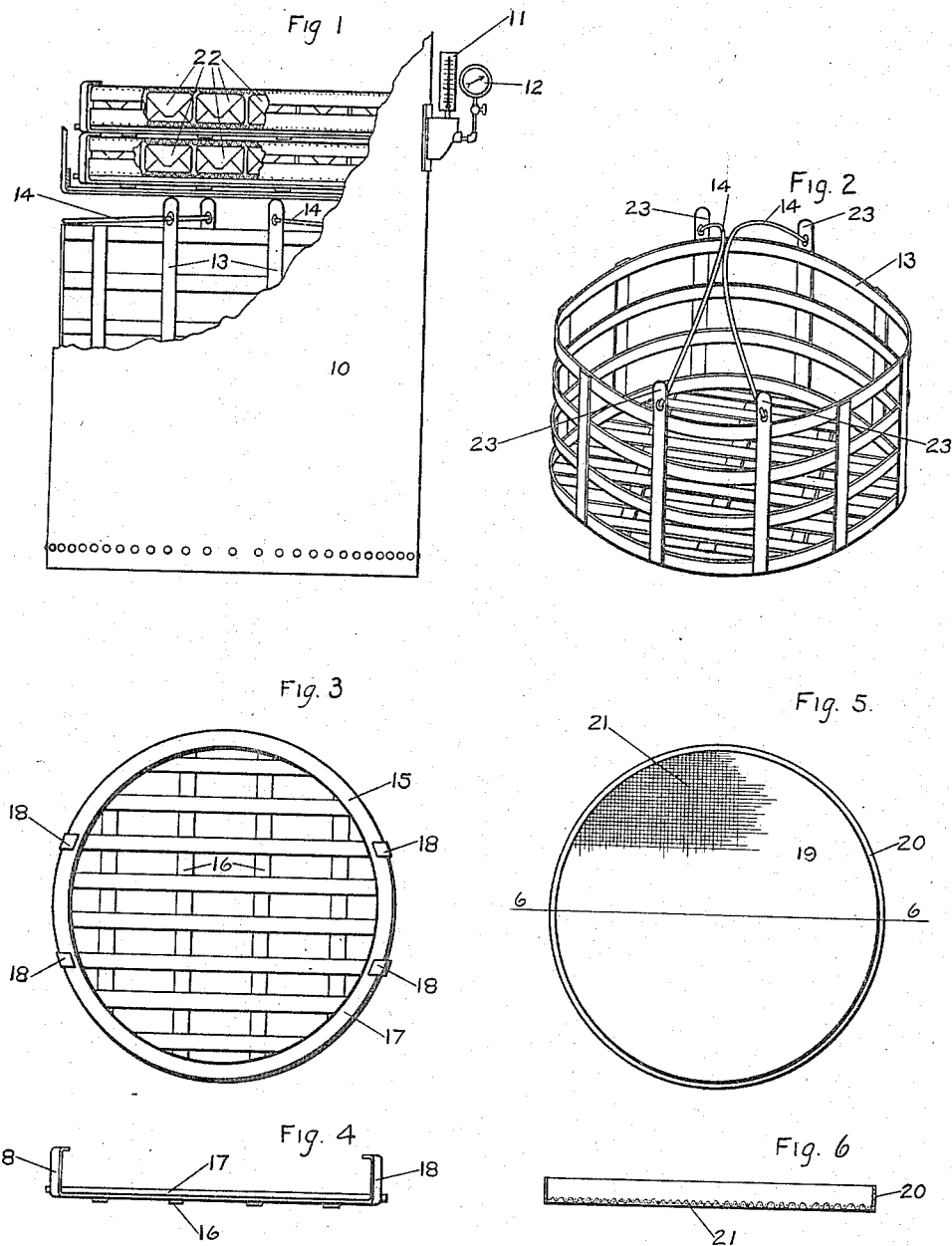

ISIDOR J. WARNER, OF LAKE VIEW, NEW YORK.

METHOD OF TREATING FISH.

1,229,555.  Specification of Letters Patent.  Patented June 12, 1917.

Application filed August 3, 1914. Serial No. 854,717.

*To all whom it may concern:*

Be it known that I, ISIDOR J. WARNER, a citizen of the United States of America, residing at Lake View, in the county of Erie and State of New York, have invented certain new and useful Improvements in Methods of Treating Fish, of which the following is a full, clear, and exact description.

My method is useful for treating meats and various varieties of fish, but it is more particularly applicable to the treatment of those fish, which are commonly known as menhaden or mossbunkers, and which, by means of my invention, are made edible and palatable.

While my method may be used for various varieties of fish and other meats, for the purpose of clearness in description, I will hereinafter particularly refer to the treatment of the menhaden.

As is well known, menhaden is one of the most abundant fish on the eastern coast of the United States of America. Formerly it was used almost solely for manure, but latterly large quantities have been converted into oil and some have been canned and sold as sardines. This fish has never been considered possible as a useful food article on account of its many bones and the large amount of oil contained in it. By means of my method, the above noted objections against this fish as a food product have been overcome, and it can be so treated that neither the large quantity of bones nor its content of oil is objectionable as a food product, since the bones are thereby softened and the oil is thereby removed.

In the drawings I have shown, simply for purposes of illustration and clearness, some appropriate apparatus for carrying out my method, but it is to be understood that there are many varieties of apparatus by means of which my method can be carried out. I shall not herein attempt to set forth all of the advantages of my invention, but many other advantages than those already referred to will be evident to those acquainted with the treatment of fish and other meats.

Reference is to be had to the accompanying drawings, forming a part of this specification, in which like characters of reference refer to like parts throughout the several views, of which:

Figure 1 is a view partly in elevation and partly in section of a well known form of process kettle with its cover omitted.

Fig. 2 is a perspective view of a well known form of crate.

Fig. 3 is a plan view of a tray or grill.

Fig. 4 is an end elevation of Fig. 3.

Fig. 5 is a top view of my separator and indicates at the top of the figure the canvas or netting which is suitably secured to the hoop of the separator.

Fig. 6 is a sectional view taken on line 6—6 of Fig. 5, and shows a complete section of the canvas or metal netting, which is suitably secured to the hoop of the separator.

10 is a process kettle of any suitable size and is of suitable metal construction. This kettle may, if desired, be interiorly provided with a perforated steam coil. It should also be equipped with a thermometer 11, or other suitable temperature indicating device and a steam gage 12. The kettle should also be provided with a suitable cover of well known construction for making it substantially steam tight.

The crate 13, used in carrying out my method, has preferably open sides and bottom. As shown in Figs. 1 and 2, this crate is of band iron construction, but obviously it can be made of other suitable material. When large quantities of fish or other meats are to be treated by means of my method, both the kettle and the crate should be of large size, and therefore it is preferable to provide the crate with bails 14 so that it may be easily handled by suitable power means, if desired.

The tray or grill 15 is preferably made with an open bottom. This bottom is shown in the drawings as made of strips of band iron 16, which are suitably secured to a hoop 17. 18 are spacers which rise high enough from the hoop 17 to be above the packages of fish after they are packed on the tray or grill.

19 is my separator and is preferably formed of a band or hoop 20, to which is suitably secured canvas or metal netting 21.

As hereinbefore stated my process can be carried out by means of the apparatus shown and just above described, but it is to be understood that other forms of apparatus may be used and my method be thereby just as successfully carried out as with that herein shown and described.

In treating the menhaden, I first scale and clean the fish and then wrap them in oiled or oil absorbing paper or cloth. When oil absorbing paper or cloth is used, this wrapping not only keeps the fish in shape during the treating process, but also acts to absorb the oil from the fish. All the oil in excess of that which is absorbed by the wrapper will be drained therethrough from the fish, and collected in the bottom of the receptacle. The wrapped fish are shown by the packages 22 in Fig. 1. The packages thus made are then packed in a layer on one of the trays or grills 15, after which one of the separators 19 is placed over the package and under the flanged ends of the separators 18. The separator thus loaded with packages of fish is then placed in the crate 13, and more trays or grills are similarly prepared and placed into the crate 13 until it is full. The crate is then lowered into the process kettle and another crate is similarly packed and lowered into the same kettle until it is supported by the bail supporters 23, or any other suitable supporters so arranged that the crates when lowered into the kettle, may be suitably separated from each other.

After the kettle has been thus filled with the packed crates, live steam and hot water are introduced into the kettle until the heat has been sufficiently raised to kill all the animal life in the meat to be treated. Ordinarily a temperature of about 160 degrees Fahrenheit will accomplish this purpose, but obviously this temperature may be varied in practice as is necessary.

The fish are removed after having been treated to the steam and hot water, and are put into suitable liquid containers where they are covered with a liquid composition made of vinegar, allspice, cloves, onions, salt-peter, pepper and salt.

The liquid composition is preferably compounded in the following proportions:

To one gallon of vinegar add:

$\frac{1}{5}$ of an ounce of allspice.
$\frac{1}{5}$ " " " " cloves.
$\frac{1}{5}$ " " " " onion.
$\frac{1}{5}$ " " " " pepper.
$\frac{1}{5}$ " " " " salt.
$\frac{4}{10}$ of 1% of an ounce of salt-peter.

The proportions just named may be varied somewhat and accomplish the desired results, and I do not claim that the precise proportion of elements is necessary, but in practice I find the proportions named to be the preferable ones for producing the desired results.

The fish, after being treated in the kettle and subjected in the liquid containers to the liquid composition just described, are left for a period of from four to six weeks in such liquid composition. This treatment softens the bones and preserves the meat of the fish and at the same time renders the product edible and palatable.

It is to be understood that some variations from the method already described may be made without departing from the spirit of my invention or the scope of the appended claims, and I do not wish to be limited to the precise details herein shown and described.

Having thus described my invention, what I claim is:

1. A method of treating fish comprising the cleaning of the fish to be treated, the separate wrapping of each individual fish to be treated in an oil absorbing wrapper, subjecting the package thus prepared to live steam and hot water until a sufficient temperature has been attained to kill all animal life, and draining the oil from the fish.

2. A method of treating fish comprising the cleaning of the fish to be treated, the separate wrapping of each individual fish to be treated in a suitable oil absorbing wrapper, the packing of such wrapped fish in a plurality of trays, suitably spaced apart to prevent deformation of the fish, then treating said wrapped fish to live steam and hot water until the animal life has been destroyed therein, and then draining the oil from the fish.

3. A method of treating fish comprising the cleaning of the fish to be treated, the separate wrapping of each individual fish in suitable oil absorbing wrappers, packing a plurality of such wrapped fish on an open bottom tray, the protecting of such packed and wrapped fish by separators, packing a plurality of such prepared trays in crates, treating such packed crates in an inclosed container to live steam and hot water until the animal life has been killed therein, then removing said treated fish from said container, and draining the oil from such fish.

4. A method of treating fish comprising the cleaning of the fish to be treated, the separate wrapping of each individual fish in suitable oil absorbing wrappers, packing such wrapped fish in a container so as to prevent their deformation, then treating such wrapped fish in said container to live steam and hot water until all animal life has been killed therein, then removing such treated fish from said container, and then draining the oil from said fish.

5. A method of treating fish comprising the cleaning of the fish to be treated, the separate wrapping of each individual fish in suitable oil absorbing wrappers, packing such fish in such a way as to prevent their deformation in a closed container, then treating such fish in said container to live steam and hot water until all animal life has been killed therein, then removing such treated fish from said container, and then draining the oil from said fish.

In testimony whereof, I have hereunto signed my name in the presence of two subscribing witnesses.

ISIDOR J. WARNER.

Witnesses:
JOHN F. MURRY,
J. WM. ELLIS.

Copies of this patent may be obtained for five cents each, by addressing the "Commissioner of Patents, Washington, D. C."